United States Patent
Grossman et al.

(10) Patent No.: US 6,697,391 B2
(45) Date of Patent: Feb. 24, 2004

(54) INTRACAVITY RESONANTLY ENHANCED FOURTH-HARMONIC GENERATION USING UNCOATED BREWSTER SURFACES

(75) Inventors: William M. Grossman, Los Altos, CA (US); Jeffrey D. Kmetec, Palo Alto, CA (US)

(73) Assignee: Lightwave Electronics, Mountain VIew, CA (US)

( * ) Notice: Subject to any disclaimer, the term of this patent is extended or adjusted under 35 U.S.C. 154(b) by 0 days.

(21) Appl. No.: 10/113,921

(22) Filed: Mar. 28, 2002

(65) Prior Publication Data

US 2003/0214984 A1 Nov. 20, 2003

(51) Int. Cl.$^7$ .................................................. H01S 3/10
(52) U.S. Cl. .............................. 372/22; 372/21; 372/28
(58) Field of Search ................................ 372/21, 22, 28

(56) References Cited

U.S. PATENT DOCUMENTS

| | | | |
|---|---|---|---|
| 3,873,825 A | 3/1975 | Jones et al. ................. 359/129 |
| 4,510,402 A | 4/1985 | Summers et al. ........... 359/329 |
| 5,017,806 A | 5/1991 | Edelstein et al. ........... 359/330 |
| 5,033,057 A | 7/1991 | Bosenberg et al. .......... 372/72 |
| 5,034,951 A | 7/1991 | Edelstein et al. ............. 373/33 |
| 5,047,668 A | 9/1991 | Bosenberg .................. 359/330 |
| 5,052,780 A | 10/1991 | Klein .......................... 359/638 |
| 5,052,815 A * | 10/1991 | Nightingale et al. .......... 372/94 |
| 5,276,695 A | 1/1994 | Scheps ......................... 372/20 |
| 5,295,143 A | 3/1994 | Rao et al. ..................... 372/22 |
| 5,384,803 A | 1/1995 | Lai ............................. 372/100 |
| 5,408,481 A | 4/1995 | Scheps ......................... 372/22 |
| 5,487,079 A | 1/1996 | Esterowitz et al. ........... 372/20 |
| 5,530,711 A | 6/1996 | Scheps ......................... 372/20 |
| 5,590,148 A | 12/1996 | Szarmes ..................... 372/105 |
| 5,682,397 A | 10/1997 | Scheps ......................... 372/22 |
| 5,764,662 A | 6/1998 | Pinto ........................... 372/20 |
| 5,850,407 A * | 12/1998 | Grossman et al. ............ 372/22 |
| 6,031,854 A * | 2/2000 | Ming .......................... 372/22 |
| 6,061,370 A * | 5/2000 | Yin ............................. 372/22 |
| 6,097,742 A | 8/2000 | Caprara et al. ............... 372/22 |
| 6,229,829 B1 * | 5/2001 | Yin ............................. 372/22 |
| 6,249,371 B1 * | 6/2001 | Masuda et al. ............. 359/326 |
| 6,285,702 B1 * | 9/2001 | Caprara et al. ............... 372/92 |

(List continued on next page.)

FOREIGN PATENT DOCUMENTS

| JP | 3248588 | 6/1991 | .......... H01S/3/109 |
| WO | 9801790 | 1/1998 | ............. H01S/3/94 |

OTHER PUBLICATIONS

A. Alfrey, "Intracavity Tripling of Diode–Pumped Nd:YVO4 at High Q–Switch Repetition Rates," CLEO '96 Technical Digest, Postdeadline Paper Proceedings CPD19, Optical Society of America, Washington D.C., 1996.

(List continued on next page.)

Primary Examiner—Paul Ip
Assistant Examiner—Phillip Nguyen
(74) Attorney, Agent, or Firm—J D I Patent; Joshua D. Isenberg

(57) ABSTRACT

An optical fourth-harmonic generation system includes a resonant cavity configured to support electromagnetic radiation of a fundamental frequency and a fourth-harmonic generator disposed within the resonant cavity produces electromagnetic radiation of a fourth-harmonic frequency by an interaction with radiation of the fundamental frequency. The fundamental radiation is characterized by a p polarization that is complementary to an s polarization that characterizes the fourth-harmonic radiation. The fourth-harmonic generator has an output facet oriented substantially at a Brewster's angle with respect to the fundamental radiation to separate the fundamental radiation from the fourth-harmonic radiation as they emerge from the output facet.

34 Claims, 2 Drawing Sheets

U.S. PATENT DOCUMENTS

| | | | |
|---|---|---|---|
| 6,298,076 B1 | 10/2001 | Caprara et al. | 372/43 |
| 6,327,281 B1 * | 12/2001 | Yin | 372/22 |
| 6,347,102 B1 * | 2/2002 | Konno et al. | 372/22 |
| 6,366,596 B1 * | 4/2002 | Yin et al. | 372/92 |
| 6,584,134 B2 * | 6/2003 | Yin et al. | 372/92 |
| 6,587,487 B2 * | 7/2003 | Yin | 372/22 |

OTHER PUBLICATIONS

Koechner, Solid State Laser Engineering, Ch. 10, Nonlinear Devices, Fourth ed., Springer Series in Optical Sciences v. 1 (1996), pp 562–641.

*CRC Handbook of Laser Science and Technology*, vol. I, Lasers and Masers, Editor M. J. Weber, CRC Press, Inc, Boca Raton Florida, pp 265–273.

S. V. Popov et et al., "Efficient Non–Linear Conversion in Periodically–Poled Crystals using High Power, Seeded, Fiber Amplifiers", Presented at CLEO Conference, May 25, 1999, Baltimore, MD.

*Series 2000 Laser Offset Locking Accessory Users Manual*, Oct. 21, 1995, Lightwave Electronics Corporation, Mountain View CA.

I. Zawischa et al., "All–Solid State Neodymium–based Single–Frequency Maseter–Oscillator Fiber Power–Amplifier System Emitting 5.5 W of Radiation at 1064 nm", Optics Letters, vol. 24, No. 7, Apr. 1, 1999.

D. Inniss, et al. "Ultahigh–Power Single–Mode Fiber Lasers from 1.065 to 1.472 $\mu$m using Yb–doped Cladding–Pumped and Cascaded Raman Lasers", CLEO 1997 Post Deadline.

"SDL leads the way with telco–grade Raman sources", SDL–RL30 Advertising Brochure, SDL, Inc, 80 Rose Orchard Way, San Jose, CA 95134–1365.

R. Wu et al. *"Intracavity Fourth Harmonic Generation Using Three Pieces of LBO in a Nd:YAG Laser"*, OSA Proceedings on Advanced Solid State Lasers, 1994, vol. 20.

\* cited by examiner

INTRACAVITY RESONANTLY ENHANCED FOURTH-HARMONIC GENERATION USING UNCOATED BREWSTER SURFACES

FIELD OF THE INVENTION

The present invention relates to the field of optical frequency harmonic generation, and in particular to optical fourth-harmonic generation.

BACKGROUND OF THE INVENTION

Short wavelength (e.g., ultraviolet) lasers find use in drilling, microwelding, micromachining, component trimming, glass and semiconductor marking, rapid prototyping, electronic packaging, corneal sculpturing, cardiac surgery to give blood flow to heart muscles, fluorescence spectroscopy, including time resolved techniques. The relative lack of availability of short-wavelength lasers has fueled much of the research effort to develop radiation sources based on frequency conversion. Radiation sources based on second- third- and fourth-harmonic generation have been proposed for producing coherent ultraviolet (UV) radiation.

In a conventional system based on third-harmonic generation, radiation of a fundamental ($\omega$) frequency is used in a -non-linear crystal to produce radiation of a second-harmonic ($2\omega$) frequency. The second harmonic radiation is mixed with the fundamental radiation, typically in a different non-linear crystal, to produce radiation of a third-harmonic ($3\omega$) frequency. The third-harmonic radiation (a useful output of the system) may then be physically separated from the fundamental, second-harmonic and third-harmonic. radiation, e.g., using an intracavity or extracavity, element such as any prism, a grating, a Brewster prism or a dichroic-coated mirror. Because of the relative inefficiencies of the three frequency-conversion steps, the intensity of the third-harmonic-radiation may be much lower than that of the fundamental radiation. Consequently, third-harmonic systems are extremely sensitive to optical losses, and in particular to losses to the fundamental radiation.

The second- and third-harmonic crystals are usually anti-reflection coated to prevent back reflections from the input and output surfaces of the crystals. Optical coatings are generally very, sensitive to optical-damage, however, and in particular to damage, caused by short-wavelength radiation. An arrangement allowing the use of optically-uncoated crystal surfaces while simultaneously providing for wavelength separation and avoiding the back-reflection problem would be of great value in a radiation source based on third-harmonic generation. Such an arrangement would be particularly desirable for a system using intracavity frequency conversion element(s).

Prior art third-harmonic system for generating ultraviolet (355 nm) radiation from infrared (1064 nm) radiation have used lithium triborate (LBO) crystals for frequency doubling and tripling in a resonant cavity containing a Nd-YAG solid state laser. Brewster-cut intracavity prisms have been used to separate the ultraviolet beam from the fundamental beam.

Although intracavity prisms may reduce losses relative to beam separation schemes using dichroic mirrors, the intracavity prism tends to increase the complexity of the system. Furthermore, intracavity prisms do not alleviate the need for anti-reflection coating the output surface of the frequency-tripling crystal in order to minimize losses to the fundamental and third-harmonic radiation beams. Leaving the output surface uncoated in such prior art systems would result in high losses to the fundamental radiation. At the same time, the use of an AR coating for the output surface severely limits the useful lifetime of the system, due to catastrophic or long-term UV-induced damage to the AR coating.

Commonly assigned U.S. Pat. No. 5,850,407 describes a third-harmonic generator system that uses a second-harmonic generating crystal coupled to a third-harmonic generating crystal. The third-harmonic generating crystal has an uncoated dispersive output facet. The output facet is preferably oriented at Brewster's angle with respect to the fundamental and third harmonic radiation, such that the output facet does not substantially impede the passage of fundamental or third harmonic radiation. In addition, the output facet impedes the passage of any s-polarized component of radiation, thus acting as a polarization-selective element. The dispersive output facet spatially separates fundamental radiation of frequency $\omega$ from third-harmonic radiation of frequency $3\omega$. In this system, both the fundamental and third-harmonic radiation are p-polarized with respect to the output facet.

Non-linear materials have also been used to produce radiation of a fourth-harmonic of the fundamental. For example, the third-harmonic radiation may be mixed with the fundamental radiation, typically in another different non-linear crystal, to produce radiation of a fourth-harmonic ($4\omega$) frequency. Unfortunately, attempts to produce a suitably configured fourth-harmonic generator system have been unsatisfactory, particularly for multi-kilohertz systems.

Early attempts used a first non-linear material, e.g., to generate 532 nm second-harmonic radiation from 1.064-micron fundamental radiation. A second non-linear material generated 266 nm fourth-harmonic from the 532 nm second-harmonic radiation by a frequency doubling interaction. Unfortunately, the 532 nm to 266 nm frequency doubling interaction does not phase match in LBO, which is a most robust and desirable non-linear material. KDP and its isomorphs have been used successfully in low repetition rate joule-class systems but not in multi-kilohertz systems or lower energy systems. Other prior art attempts have utilized three non-linear crystals. The first crystal doubles 1.064-micron fundamental radiation to generate 532 nm second-harmonic radiation. The second crystal sums a portion of the fundamental radiation with the second-harmonic radiation to produce 355 nm third-harmonic radiation. The third crystal sums a portion of the fundamental radiation with the third-harmonic radiation to produce 266 nm fourth-harmonic radiation. If the fundamental and third-harmonic are polarized in the same state then the fourth-harmonic is orthogonally polarized with respect to fundamental and third-harmonic. Hence, if the fundamental radiation is p-polarized with respect to a Brewster prism surface then the fourth-harmonic is unfortunately s-polarized. As a result, it is necessary to either rotate the polarization of the fourth-harmonic radiation to p-polarization in order to meet the Brewster's angle condition at the output facet of the fourth harmonic generator crystal or anti-reflection (AR) coat the output facet. It is extremely difficult to rotate the polarization of the fourth-harmonic radiation without either compromising the fourth-harmonic phase matching or making the system more complex, e.g., by bonding a polarization rotating region onto the fourth-harmonic generator crystal. Techniques involving harmonically-selected waveplates, etc. require AR coatings. AR coatings are highly susceptible to damage at UV frequencies, which reduces the useful lifetime of system components. Thus it has been difficult to meet the Brewster angle condition for p-polarized fundamental and fourth-harmonic radiation while phase matching the radiation to the fourth-harmonic-generating crystal without using AR coated surfaces and/or Brewster prisms.

Thus, there is a need in the art, for a fourth-harmonic generating system and method that overcomes the above disadvantages.

BRIEF DESCRIPTION OF THE DRAWINGS

The teachings of the present invention can be-readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1A:
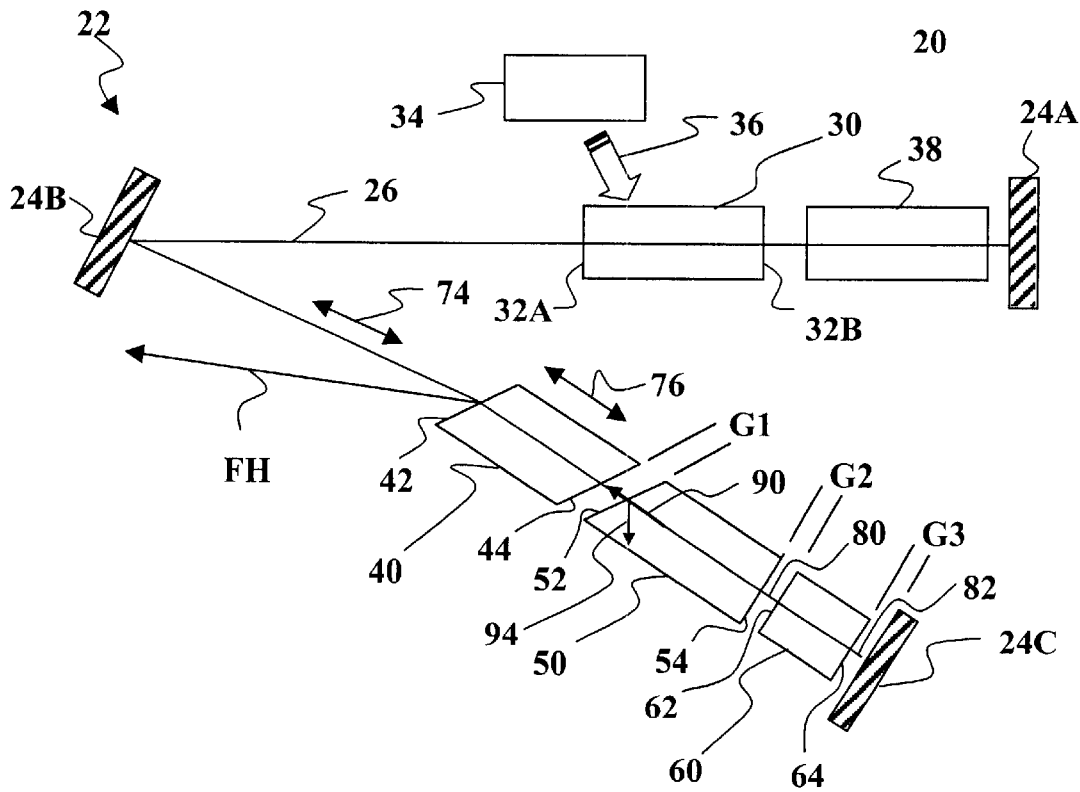
FIG. 1A is schematic diagram illustrating an optical fourth-harmonic generation system according to an embodiment of the present invention.
Figure 1B:
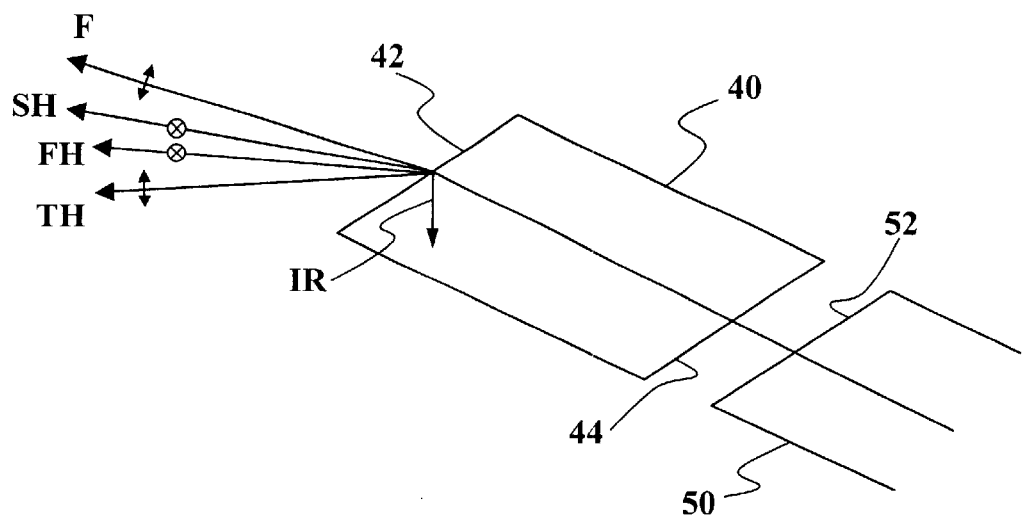
FIG. 1B shows a close-up of a portion of FIG. 1A illustrating an optical fourth-harmonic generation system according to an embodiment of the present invention.

FIG. 1A is a schematic diagram of an example of a fourth-harmonic optical system 20 according to an embodiment of the present invention, while FIG. 1B is a detail showing a portion of the system 20. The system 20 may generally include a resonant cavity 22, e.g., defined by two or more reflectors, e.g., first, second and third reflectors 24A–24C. The cavity 22 is configured to support a fundamental electromagnetic radiation 26 characterized by a fundamental frequency ω. The cavity 22 may be configured to support the fundamental radiation, e.g., by choosing the dimensions (e.g. radii), reflectivities and spacings of the reflectors 24A–24C such that cavity 22 is a resonator capable of supporting radiation of the fundamental frequency ω. Although a V-shaped cavity 22 is depicted in FIG. 1A, those of skill in the art will be able to devise other cavities, e.g., having stable, unstable, 4-mirror Z-shaped, 5-mirror W-shaped, cavities with more legs, ring-shaped, or linear configurations to name but a few of many possible examples.

The fundamental radiation 26 may be generated by an active medium 30 situated within the cavity 22. By way of example, the active medium 30 may be a Nd-YAG Brewster rod having a 1% dopant level. Other suitable active media include end-pumped or side-pumped solid, liquid, and gaseous media such as Nd:YAG, Nd:YLF, Nd:YVO$_4$, Nd:YALO, Nd:Glass, Yb:YAG, Yb:Glass, Ruby Titanium Sapphire, CrLiSAF, of various shapes and sizes and with higher or lower dopant levels. The active medium 30 may be pumped by an external source 34 of energy 36. Such pumping energy may be in the form of radiation introduced through one or more sides and/or ends of the active medium 30. The system 20 may include a pulsing mechanism 38 that facilitates generation of high-intensity radiation pulses (e.g. a Q-switch, a modelocker or a gain control device).

The active medium 30 may have two end surfaces 32A–32B through which the fundamental radiation, 26 passes. The end surfaces 32A–32B may be situated at a Brewster's angle $\Theta_B$ relative to the radiation 26, such that the fundamental radiation 26 is p-polarized with respect to the end surfaces 32A–32B, i.e. polarized in the plane of the plane of incidence of the fundamental radiation 26. Alternatively, the end surfaces 32A–32B of active medium 30 may be normal (perpendicular) or near normal to the direction of propagation of the fundamental radiation 26 or they may be at some other angle.

A fourth-harmonic generator (FHG) 40 is disposed within the resonant cavity 22. The fourth harmonic generator produces fourth-harmonic radiation FH characterized by a fourth-harmonic frequency 4ω, eg from an interaction with the fundamental radiation 26 and third-harmonic radiation of frequency 3ω. Generally, the wavelength of the fundamental radiation 26 is chosen so that the fourth-harmonic generator 40 produces fourth-harmonic radiation FH of some desired fourth-harmonic wavelength. The fourth-harmonic wavelengths of most practical interest are between 190 nm in the UV and 450 nm in the visible (blue). The fourth-harmonic radiation FH preferably has a wavelength of 266 nm.

The FHG 40 may be a non-linear medium such as lithium triborate (LBO), beta-barium borate (BBO), Cesium Lithium Borate (CLBO), KDP and its isomorphs. The reaction that produces the fourth-harmonic radiation FH phase matches in these materials. Other crystals that satisfy the phase match conditions include ADA, ADP, CBO, DADA, DADP, DKDP, DLAP, DRDP, KABO, KDA, KDP, LB4, or LFM. In a preferred embodiment, the FHG 40 is a lithium triborate (LBO) crystal. The FHG 40 includes an output facet 42 oriented substantially at a Brewster's angle with respect to the fundamental radiation 26. As shown in FIG. 1B, the fundamental radiation F is characterized by a p polarization that is complementary to an s polarization that characterizes the fourth-harmonic radiation FH. Consequently, the fundamental radiation F and the fourth-harmonic radiation FH emerging. from the output facet 42 may be spatially separated. In the example shown in FIGS. 1A–1B, the output facet 42 faces the active medium 30. The FHG 40 may include an input facet 44 located opposite the output facet 42. The input facet 44 may be oriented substantially parallel (e.g., within optical tolerances) with respect to the output facet 42 such that the input facet 44 is oriented substantially at a Brewster's angle $\theta_B$ with respect to the fundamental radiation 26.

The output facet 42of the FHG 40 is preferably optically uncoated such that the output facet 42 is resistant to damage caused by the fourth-harmonic radiation FH. The output facet 42 may have a mechanically and optically robust coating, but preferably lacks an anti-reflection coating. In particular, the output facet 42 need not have, and preferably does not have, optical coatings for preventing reflections of radiation at the fundamental or fourth-harmonic wavelengths. The absence of optical coatings makes the output facet 42 relatively insensitive to optical damage, and in particular to damage caused by fourth-harmonic and other UV radiation. Many commercial applications require essentially damage-free (<0.1% damage-induced losses) operation for thousands of hours, preferably >10,000 hours, at high power levels (total powers on the order of watts, corresponding to local peak power densities on the order of $10^7$ to over $10^9$ W/cm$^2$ for a spot size of 150 μm diameter). Those skilled in the art will recognize that to have damage-free generation, extreme attention to the cleanliness of the optics exposed to UV is required. Innumerable contaminants, innumerable outgassing materials, and innumerable gaseous impurities in the ambient environment of the UV optical surfaces can easily compromise performance.

To enhance the output of fourth-harmonic radiation, it is desirable that output facet 42 be cut at an oblique angle to direction of propagation of fundamental radiation 26 between FHG 40 and the second reflector 24B (indicated by the arrow 74). It is also desirable that output facet 42 be oriented at an oblique angle to direction of propagation of fundamental, second-harmonic, third-harmonic, and fourth-harmonic radiation incident upon output facet 42 from within the FHG 40 (indicated by the arrow 76). In practice arrows 74 and 76 are typically not mutually parallel. Preferably, output facet 42 is Brewster-cut such that output facet 42 does not impede the passage of fundamental and third-harmonic p-polarized radiation. The angle between the normal to output facet 42 and direction given by the arrow 76 is given approximately by Brewster's angle $$\theta_B = \text{Arctan}\left(\frac{n_2}{n_1}\right) \quad [1]$$

wherein $n_2$ and $n_1$ are respectively the indices of refraction of FHG 40 and the medium outside the FHG 40, e.g., air. As is apparent to the skilled artisan, the index of refraction of FHG 40 can vary with wavelength, and consequently Brewster's angle can vary somewhat with wavelength. The orientation of the output facet 42 is chosen so as to satisfy Brewster's condition within optical fabrication tolerances for the fundamental radiation direction 76, since the fourth-harmonic output intensity is most sensitive to losses introduced at the fundamental frequency. Furthermore, fundamental radiation F and the fourth harmonic radiation FH emerging from the output facet 42 refract at different angles due to differing indices of refraction. The cavity 22 may be configured such that the fourth-harmonic radiation exits the cavity 22 as an output, e.g., by suitable sizing, curvature, placement, and orientation of the second reflector 24B as well as the configured angle of incidence upon the second reflector 24B.

To enhance the output of fourth-harmonic radiation FH from the system 20, the fundamental radiation 26 is p-polarized with respect to the output facet 42, e.g., parallel to the plane of the drawing in FIG. 1A, as illustrated by the arrow 28. A polarization attribute intrinsic to the active medium 30 or a polarization selection device separate from the active medium 30 may be used in addition to surfaces 32A–32B and output facet 42 for selecting linearly-polarized fundamental radiation (of some desired polarization orientation) for propagation within cavity 22. Referring to FIG. 1B, the fundamental radiation 26 may be p-polarized in the plane of the drawing while the fourth-harmonic radiation FH is s-polarized perpendicular to the plane of the drawing. The s- and p-polarizations are complementary, e.g. mutually orthogonal, to each other. This type of configuration is somewhat counterintuitive in that the output facet 42 does not satisfy Brewster's condition for the desired output radiation, i.e., the fourth-harmonic radiation FH. Consequently, although such an arrangement may enhance the transmission of fundamental radiation F emerging from the output facet 42, it may impede the transmission of the fourth-harmonic radiation FH emerging from the output facet 42. Approximately 20% of the fourth-harmonic radiation FH incident on the output facet from inside the FHG 40 may be lost as internally reflected radiation IR. This configuration is contrary to prior art third-harmonic and fourth-harmonic generation schemes, which polarize both the fundamental radiation and the desired output radiation to achieve the Brewster angle condition at an output facet in order to avoid such losses due to internal reflection. The inventors have determined that several advantages that may be obtained by the embodiments of the present invention, such as those depicted in FIGS. 1A–1B outweigh the disadvantages associated with losses due to internal reflection. These advantages include a simple intracavity design without the need for prisms or AR-coated surfaces and the ability to phase-match using robust, durable nonlinear materials such as LBO as the fourth-harmonic generator 40.

By way of example, the FHG 40 may produce the fourth-harmonic radiation by an interaction with the fundamental radiation 26 and a third-harmonic radiation TH characterized by a third-harmonic frequency 3ω. The efficiency of the FHG 40 in converting the third harmonic radiation TH to fourth-harmonic radiation FH may be enhanced if both the fundamental radiation 26 and the third-harmonic radiation TH are p-polarized with respect to both facets 42, 44 of the FHG 40 and both facets are at substantially a Brewster angle with respect to the direction of propagation of radiation fundamental and third-harmonic radiation in FHG 40. Brewster's angles for the fundamental radiation F and third harmonic radiation TH can be substantially identical for commonly used materials and wavelengths. For example, Brewster's angles for 355 nm and 1064 nm p-polarized radiation differ by about 0.65° in LBO, which corresponds to about a 0.1% loss in the output power of the third harmonic due to the non-ideal Brewster-matching for the third harmonic.

In the particular example depicted in FIG. 1A the third-harmonic radiation may be produced by a third-harmonic generator (THG) 50 situated within the resonant cavity 22, e.g., between the FHG 40 and the third reflector 24C. The THG 50 may include a non-linear material such as a crystal of lithium triborate (LBO) BBO, lithium niobate (LiNbO$_3$), CLBO, the other materials described above with respect to the FHG 40 plus other suitable phase-matched materials. The THG 50 may produce the third-harmonic radiation TH by an interaction between the fundamental radiation 26 and a second-harmonic radiation SH characterized by a second-harmonic frequency 2Ω. The second-harmonic radiation SH may, in turn, be produced by a second-harmonic generator (SHG) 60 situated within the resonant cavity 22, e.g., between the THG 50 and the third reflector 24C. The second harmonic generator 60 may also be a LBO crystal or other nonlinear material as described above. The crystal axes of the FHG 40, the THG 50 and the SHG 60 may be oriented differently with respect to the direction of radiation propagation within them, according to their respective functions. Generally, various other structures can be used for the FHG 40, THG 50 and SHG 60, including LiNbO$_3$, KDP (and isomorphs), or LiIO$_3$ crystals, as well as quasi-phase-matched materials such as periodically-poled lithium tantalate, lithium niobate, periodically-poled lithium niobate (PPLN) or KTP. In a quasi-phase-matched material, the fundamental and higher harmonic radiation can have identical polarizations.

The THG 50 and the SHG 60 may be configured in such a way as to enhance the efficiency of production of the third-harmonic radiation TH. In particular the length of the SHG 60 may be suitably chosen such that fundamental radiation 26 is converted to second-harmonic radiation with low enough efficiency to leave, a strong circulating power in the fundamental radiation 26 for mixing with the second-harmonic radiation SH and the third-harmonic radiation TH.

Similarly, the length of the THG 50 may be chosen to enhance the interaction between the second-harmonic radiation SH and the fundamental radiation 26 in order to produce the third-harmonic radiation TH. By way of example, for SHG 60 and THG 50 made using LBO crystals the SHG 60 may have a length of about 3 mm and the THG 50 may have a length of 15–20 mm. The SHG 60 and the THG 50 may be oriented to minimize walk-off of the second-harmonic radiation SH from the fundamental radiation 26 to optimize efficiency.

The output of fourth-harmonic radiation FH may be enhanced by suitable configuration of the THG 50. For example, the THG 50 may have an output facet 52 facing the input facet 44 of the FHG 40 and an output facet 44 facing the SHG 60. The output facet 52 of the THG 50 may be separated from the input facet 44 of the FHG 40 by a gap G1. The SHG 60 may have opposite facets 62 and 64 respectively facing the input facet 54 of the THG 50 and the third reflector 24C. The output facet 62 of the SHG 60 may be separated from the input facet 54 of the THG 50 by a gap G2. The input facet 64 of the SHG 60 may be separated from the third reflector 24C by a gap G3. The facets 62 and 64 may serve as both input and output facets for the SHG 60, as explained below. The facets 62 and 64 may be normal-cut (or near-normal), and oriented normal (or near-normal) to the direction of radiation passing through the FHG 40, THG 50 and SHG 60 (illustrated by arrow 76). The Facets 62 and 64 may be anti-reflection (AR) coated for radiation at 1064 nm and 532 nm. Anti-reflection coatings for given wavelength ranges are well known in the art. The input facet 54 of THG 50 may also be near-normal-cut, normal to the direction of radiation propagation through THG 50. The input facet 54 may be AR-coated for radiation of the fundamental frequency to and second-harmonic frequency 2ω if the coating will not seriously degrade under prolonged exposure to such radiation.

The output of the fourth-harmonic radiation FH may also be enhanced by suitably configuring the reflectors 24A–24C. The reflectors may be arranged to set the mode of the cavity 22 in the gain medium 30 and at the second-, third-, and fourth-harmonic generators 60, 50, 40. In the system 20 depicted in FIG. 1A, it may be desirable for the first and second reflectors 24A, 24B to be highly reflective (e.g., >99.9% reflectivity) for radiation at the fundamental frequency ω. The third reflector 24C may have a high reflectivity for the fundamental radiation 26 and the second-harmonic radiation SH.

The system 20 may generate fourth-harmonic radiation as follows. Fundamental, p-polarized radiation 26 generated by the active medium 30 is incident on the facet 62 of the SHG 60. The SHG 60 generates s-polarized second-harmonic SH, part of which is incident on the input facet 54 of the THG 50 and part of which reflects from the third reflector 24C. For an SHG 60 based e.g., on LBO, the reaction that produces the second harmonic radiation from the fundamental radiation is phase matched for wavelengths of interest, e.g., 1.064 microns for the fundamental radiation 26 and 532 nm for the second-harmonic radiation SH. The polarization direction of the s-polarized second-harmonic radiation SH is perpendicular to the plane of the drawing in FIG. 1A. Second harmonic radiation reflected by the third reflector 24C is incident on facet 64. A beam section 80 between the SHG 60 and the THG 50 includes fundamental radiation traveling in both directions, as well as second-harmonic radiation traveling from SHG 60 to THG 50. A beam section 82 between the SHG 60 and the third reflector 24C includes both fundamental radiation and second-harmonic radiation traveling in both directions. Fundamental radiation and second harmonic radiation are thus incident on input facet 54 of THG 50.

The THG 50 generates p-polarized third harmonic radiation TH, by mixing portions of the fundamental radiation 26 and second harmonic radiation SH that are incident on input facet 54. For a THG 50 based e.g., on LBO, the reaction that produces the third-harmonic radiation is phase matched at wavelengths of interest, e.g., 1.064 microns for the fundamental radiation 26, 532 nm for the second-harmonic radiation SH and about 355 nm for the third-harmonic radiation TH exits the THG 50 through the output facet 52, as does some of the second-harmonic radiation SH and a portion of the fundamental radiation 26. Since the second harmonic radiation SH is s-polarized, some of the second harmonic radiation may be back reflected by output facet 52 to form an internally reflected beam 94. The internally reflected beam 94 and portions of the second-harmonic radiation SH that reflect off subsequent facets 42 and 44 are preferably routed or absorbed so that they do not damage the optical components of the system 20, as is good practice for those skilled in the art. It is often preferable to avoid having the second -harmonic radiation SH strike glues, o-rings or other materials that might damage or ablate.

The third harmonic radiation beam 90 and a portion of the fundamental radiation 26 enter the FHG 40 through the input facet 44. The FHG 40 generates s-polarized fourth-harmonic radiation FH, by mixing portions of the fundamental radiation 26 and third-harmonic radiation beam 90 that are incident on input facet 44. For an FHG 40 based e.g., on LBO, the reaction that produces the fourth-harmonic radiation is phase matched at wavelengths of interest, e.g., 1.064 microns for the fundamental radiation 26, about 355 nm, for the third harmonic radiation TH, and 266 nm for the fourth-harmonic radiation FH. It is desirable that the gap G1 between the FHG 40 and the THG 50 be sufficiently small so that the dispersive separation between the fundamental and third-harmonic radiation entering the FHG 40 is small compared to the beam diameter φ. By way of example, and without limiting the invention, this condition may be expressed as follows:

$$(G1)\,(\text{separation}) \ll \qquad [2]$$

If the beam separation is about 1° (about 1/60 radians), equation [2] may be rewritten as $$(G1) \ll 60\phi \qquad [3]$$

For a beam diameter φ of about 0.15 mm, G1 is preferably less than 10 mm. In other embodiments of this invention, the separation could be greater with the use of optical imaging to compensate this separation effect, but at the cost of added (damage-susceptible) optics.

The fourth-harmonic radiation beam FH exits the FHG 40 through the output facet 42, as does some third-harmonic radiation, some second-harmonic radiation SH, and a portion F of the fundamental radiation 26. Since the fourth-harmonic radiation FH is s-polarized, some of the fourth-harmonic radiation FH may be back reflected by output facet 42 and is lost as internally reflected radiation IR. As discussed above with respect to reflected second-harmonic radiation, the reflected fourth-harmonic radiation FH is desirably routed or absorbed with care to avoid damage to sensitive components of the system 20. The spread in the deflections of all beams in the representation of FIG. 1B is exaggerated for clarity. Because of its oblique orientation, output facet 42 may alter the cross-section of passing radiation. For example, the cross-section of a beam can change from circular to elliptical or vice-versa after passage through output facet 42. As is apparent to the skilled artisan, intracavity or extracavity beam shaping elements may be used to attain a desired beam cross-section at particular intracavity or extracavity locations.

Since output facet 42 is not normal to the directions of radiation propagation inside and outside the FHG 40, the output facet 42 serves as a dispersive surface, spatially separating the fourth-harmonic, third-harmonic, second-harmonic, and fundamental frequency radiation according to the indices of the refraction of FHG 40 for each respective wavelength and polarization direction. Thus, a separate dispersive element such as a Brewster prism used by some prior art fourth-harmonic generation systems is not needed in this embodiment of the present invention. Moreover, since output facet 42 is approximately at a Brewster's angle relative to the direction of radiation propagation of the p-polarized fundamental radiation F, the output facet 42 does not substantially impede the passage of fundamental radiation F. Some (but very little) of the p-polarized third harmonic radiation TH may be lost but this may not be important if the fourth-harmonic generator 40 converts a significant portion of the third harmonic beam radiation 90 to fourth-harmonic radiation FH. Furthermore, antireflection coatings prone to UV-induced damage need not be used for output facet 42, without loss of cavity finesse for fundamental radiation or potentially useful output at the third harmonic frequency if the application calls for output of the third-harmonic radiation TH as well as the fourth-harmonic radiation FH. While some internally reflected fourth-harmonic radiation IR can be lost by back-reflection at output facet 42, this may be compensated for, e.g., by appropriately increasing the intensity of the fundamental radiation 26 produced by the gain medium 30 in order to achieve a desired level of useful output of fourth-harmonic radiation FH from the system 20.

Figure 1C:
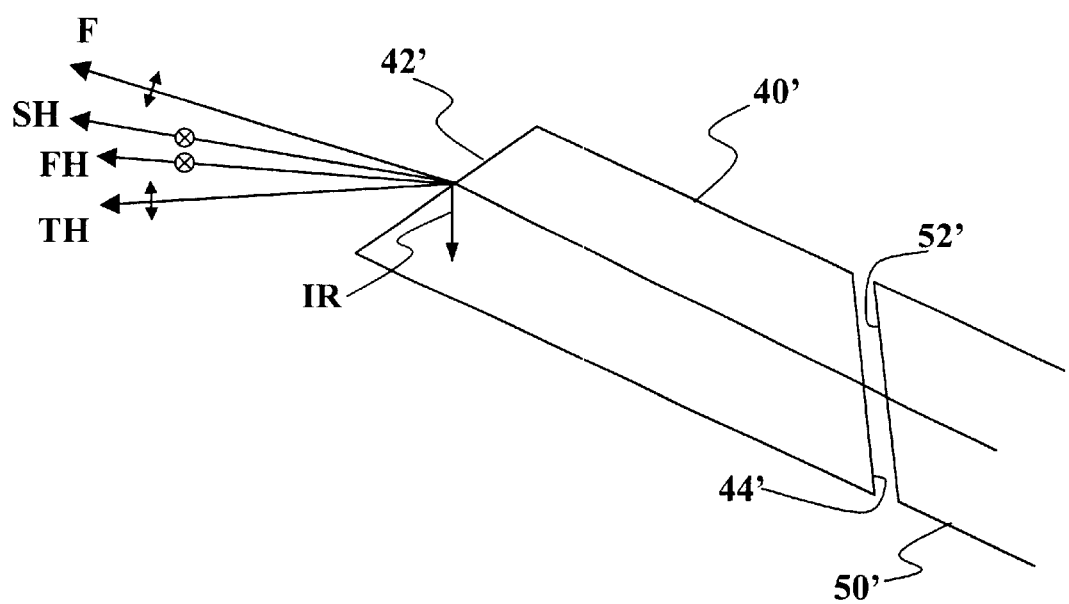
FIG. 1C depicts a schematic diagram of a portion of an optical fourth-harmonic generation system according to an alternative embodiment of the present invention.

Although the output and input facets 42, 44 of the FHG 40 are depicted as being substantially parallel to each other in FIG. 1A and FIG. 1B, other configurations are possible for the FHG 40. For example, FIG. 1C depicts an alternative embodiment of the present invention in which an FHG 40' is substantially prismatic or trapezoidal in shape. The FHG 40' has input and output facets 42', 44'. The output facet 42 could be at Brewster's angle $\theta_B$ with respect to fundamental radiation 26 but is not parallel to the input facet 44'. Preferably, the two facets 42', 44' deviate from being parallel to each other by $180°-2\theta_B$. The other components of the system 20 may be suitably configured to accommodate the FHG 40'. For example, a THG 50' optically coupled to the FHG 40' may have a facet 52' that is adjacent to and substantially parallel to the input facet 44' of the FHG 40'. Such a configuration may be desirable, e.g., to increase the angular displacement between the fundamental radiation F and the fourth-harmonic radiation FH.

It will be clear to one skilled in the art that the above embodiment may be altered in many ways, without departing from the scope of the invention. For example, the resonant cavity need not be linear or folded-ring cavities can be used. The positions or orientations of the FHG 40 THG 50 and SHG 60 relative to each other and relative to the active medium 30 may be altered. Auxiliary polarization-control devices can be used in addition to or instead of active medium Brewster surfaces for controlling the polarization characteristics of intracavity radiation. Single-mode or multi-transverse- or multi-longitudinal-mode operation can be used. A Q-switch or modelocker is not required. Multiple intracavity or extracavity polarization-selective elements such as Brewster plates or dichroic reflectors can be used. A polarization-selective element is not absolutely required.

While the above is a complete description of the preferred embodiments of the present invention, it is possible to use various alternatives, modifications and equivalents. Therefore, the scope of the present invention should be determined not with reference to the above description but should, instead, be determined with reference to the appended claims, along with their full scope of equivalents. The appended claims are not to be interpreted as including means-plus-function limitations, unless such a limitation is explicitly recited in a given claim using the phrase "means for."

What is claimed is:

1. An optical an optical fourth-harmonic generation system comprising:
   a resonant cavity configured to support selectromagnetic radiation of a fundamental frequency;
   a fourth-harmonic generator disposed within the resonant cavity configured to produce electromagnetic radiation of a fourth-harmonic frequency from an interaction with radiation of the fundamental frequency, the fourth-harmonic generator having an output facet oriented substantially at a Brewster's angle with respect to the electromagnetic radiation of the fundamental frequency, wherein the fundamental frequency is characterized by a p-polarization that is complementary to an s-polarization that characterizes the fourth-harmonic radiation, whereby radiation of the fundamental frequency and radiation of the fourth-harmonic frequency emerging from the output facet may be spatially separated as they emerge from the output facet.

2. The system of claim 1 wherein the output facet is substantially uncoated.

3. The system of claim 1 further comprising means disposed within the resonant cavity, for generating electromagnetic radiation of the fundamental frequency.

4. The system of claim 1 wherein the fourth-harmonic generator includes an input facet oriented substantially at a Brewster's angle $\theta_B$ with respect to electromagnetic radiation of the fundamental frequency.

5. The system of claim 4 wherein the input and output facets of the fourth-harmonic generator are substantially uncoated.

6. The system of claim 4 wherein the input and output facets of the fourth-harmonic generator are substantially parallel to each other.

7. The system of claim 4 wherein the input and output facets are out of parallel with respect to each other.

8. The system of claim 7 wherein the input and output facets deviate from being parallel to each other, by approximately $180°-2\theta_B$.

9. The system of claim 1 wherein the fourth-harmonic generator is configured to produce electromagnetic radiation of the fourth-harmonic frequency by an interaction with radiation of the fundamental frequency and third-harmonic radiation having a frequency corresponding to a third-harmonic of the fundamental frequency.

10. The system of claim 9 further comprising a third-harmonic generator disposed within the resonant cavity and in optical communication with the fourth-harmonic generator, wherein the third harmonic generator is configured to produce the third-harmonic radiation by an interaction with radiation of the fundamental frequency and second-harmonic radiation characterized by a frequency corresponding to a second-harmonic of the fundamental frequency.

11. The system of claim 1 wherein the resonant cavity is configured such that radiation of the fourth-harmonic frequency that emerges from the output facet exits the resonant cavity as an output radiation.

12. The system of claim 1 wherein the fourth-harmonic generator includes a crystal selected from the group of lithium triborate (LBO), beta-barium borate (BBO), cesium lithium borate (CLBO), KTP, isomorphs of KTP, ADA, ADP, CBO, DADA, DADP, DKDP, DLAP, DRDP, KABO, KDA, KDP, LB4, or LFM.

13. The system of claim 1 wherein the reaction that generates the fourth-harmonic radiation is phase matched in the fourth-harmonic generator.

14. An optical fourth-harmonic generation system comprising:
a resonant cavity configured to support electromagnetic radiation of a fundamental frequency;
a second-harmonic generator disposed within the resonant cavity, configured to produce electromagnetic radiation of a second-harmonic frequency from the radiation of the fundamental frequency;
a third-harmonic generator disposed within the resonant cavity and in optical communication with the second-harmonic generator, configured to produce electromagnetic radiation of a third-harmonic frequency from the second-harmonic frequency radiation and the radiation of the fundamental frequency, and
a fourth-harmonic generator disposed within the resonant cavity, configured to produce electromagnetic radiation of a fourth-harmonic frequency from the third-harmonic frequency radiation and the radiation of the fundamental frequency, wherein the fundamental and third-harmonic radiation are characterized by a p-polarization that is complementary to an s-polarization that characterizes the second and fourth-harmonic radiation,
wherein the fourth-harmonic generator has an output facet oriented substantially at a Brewster's angle with respect to the electromagnetic radiation of the fundamental frequency and the electromagnetic radiation of the third-harmonic frequency whereby radiation of the fundamental frequency and radiation of the fourth-harmonic frequency emerging from the output facet may be spatially separated as they emerge from the output facet.

15. The system of claim 14 wherein the output facet is substantially uncoated.

16. The system of claim 14 wherein the output facet is resistant to optical damage caused by said radiation of the fourth or third-harmonic frequencies.

17. The system of claim 14 further comprising an optical gain medium situated within the resonant cavity.

18. The system of claim 17 wherein the fourth-harmonic generator is situated along an optical path between the active medium and the third-harmonic generator such that an input facet of the fourth-harmonic generator faces the third-harmonic generator and the output facet faces the active medium.

19. The system of claim 17 further comprising a Q-switch disposed within the resonant cavity.

20. The system of claim 14 wherein the fourth-harmonic generator includes an input facet oriented substantially at a Brewster's angle with respect to electromagnetic. radiation of the fundamental frequency and electromagnetic radiation of the third-harmonic frequency.

21. The system of claim 20 wherein the input and output facets of the fourth-harmonic generator are substantially uncoated.

22. The system of claim 20 wherein the third-harmonic generator includes an output facet disposed facing the input facet of the fourth-harmonic generator, wherein the output facet of the third-harmonic generator is oriented substantially at a Brewster's angle $\theta_B$ with respect to electromagnetic radiation of the fundamental frequency and electromagnetic radiation of the third-harmonic frequency.

23. The system of claim 22 wherein the input and output facets of the fourth-harmonic generator are substantially parallel with respect to each other.

24. The system of claim 22 wherein the input and output facets of the fourth-harmonic generator are out of parallel with respect to each other.

25. The system of claim 24 wherein the input and output facets deviate from being parallel to each other by approximately $180°-2\,\theta_B$.

26. The system of claim 22 wherein the input and output facets of the fourth-harmonic generator and the output facet of the third-harmonic generator are substantially uncoated.

27. The system of claim 14 wherein the fourth-harmonic generator includes a crystal selected from the group of lithium triborate (LBO), beta-barium borate (BBO), cesium lithium borate (CLBO), KTP, isomorphs of KTP, ADA, ADP, CBO, DADA, DADP, DKDP, DLAP, DRDP, KABO, KDA, KDP, LB4, or LFM.

28. The system of claim 27 wherein the wherein the reaction that generates the fourth-harmonic radiation is phase matched in the fourth-harmonic generator.

29. An optical fourth harmonic generation method, comprising:
resonating electromagnetic radiation of a fundamental frequency in a cavity;
generating radiation of a fourth-harmonic of the fundamental frequency using a fourth harmonic generator disposed within the cavity, wherein the fundamental radiation is characterized by a p polarization that is complementary to an s polarization that characterizes the fourth-harmonic radiation,
spatially separating the fundamental radiation from the fourth-harmonic radiation at an output facet of the fourth-harmonic generator that is oriented substantially at a Brewster's angle with respect to the electromagnetic radiation of the fundamental frequency.

30. The method of claim 29 wherein generating the fourth-harmonic radiation includes an interaction between the fundamental radiation and radiation having a frequency corresponding to a third-harmonic of the fundamental frequency.

31. The method of claim 30 wherein the fourth-harmonic generator includes a crystal selected from the group of lithium triborate (LBO), beta-barium borate (BBO), cesium lithium borate (CLBO), KTP, isomorphs of KTP, ADA, ADP, CBO, DADA, DADP, DKDP, DLAP, DRDP, KABO, KDA, KDP, LB4, or LFM.

32. The method of claim 31 wherein the reaction that generates the fourth-harmonic radiation is phase matched in the fourth-harmonic generator.

33. The method of claim 29, further comprising generating electromagnetic radiation of the fundamental frequency.

34. An optical fourth harmonic generation system, comprising:
cavity means for resonating electromagnetic radiation of a fundamental frequency; fourth harmonic generator means disposed within the cavity for generating radiation of a fourth-harmonic of the fundamental frequency, wherein the fourth-harmonic radiation is characterized by an s polarization that is complementary to a p polarization that characterizes the fundamental radiation, means for spatially separating the fundamental radiation from the fourth-harmonic radiation at an output facet of the fourth-harmonic generator that is oriented substantially at a Brewster's angle with respect to the electromagnetic radiation of the fundamental frequency whereby radiation of the fundamental frequency and radiation of the fourth-harmonic frequency emerging from the output facet may be spatially separated as they emerge from the output facet.

* * * * *